No. 816,518. PATENTED MAR. 27, 1906.
H. WIARD.
PLOW.
APPLICATION FILED SEPT. 7, 1899.
5 SHEETS—SHEET 1.
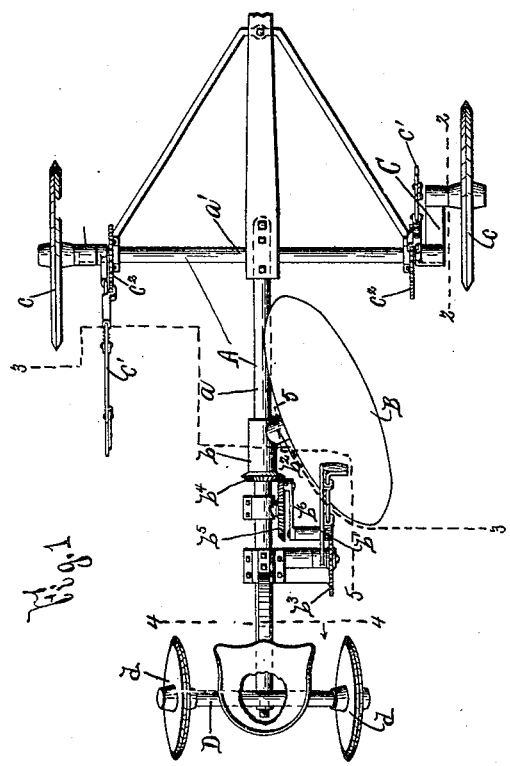
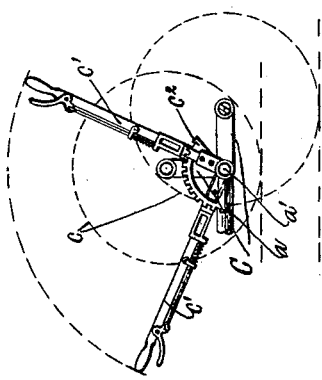
WITNESSES:
M. D. Lewis.
G. A. Cowles.
INVENTOR
Harry Wiard
BY
Hugh Parsons
ATTORNEYS.

No. 816,518. PATENTED MAR. 27, 1906.
H. WIARD.
PLOW.
APPLICATION FILED SEPT. 7, 1899.
5 SHEETS—SHEET 2.
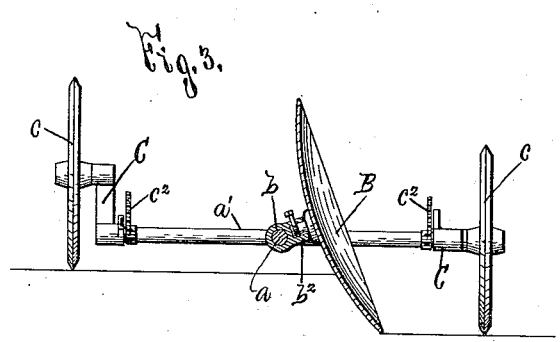
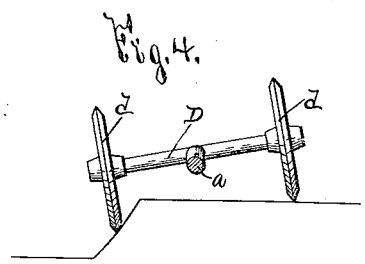
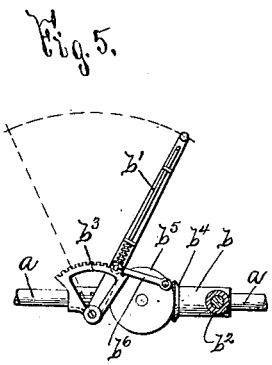
WITNESSES:
M. D. Lewis.
G. A. Cowles.
INVENTOR
Harry Wiard
BY
Hey & Parsons
ATTORNEYS.

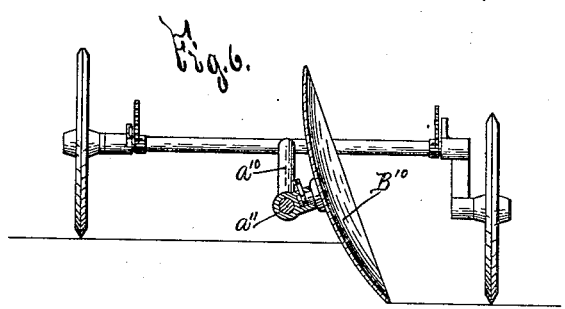
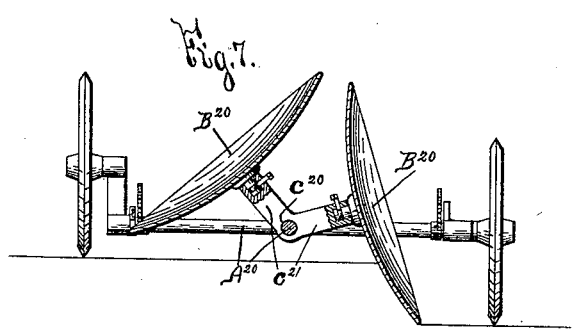
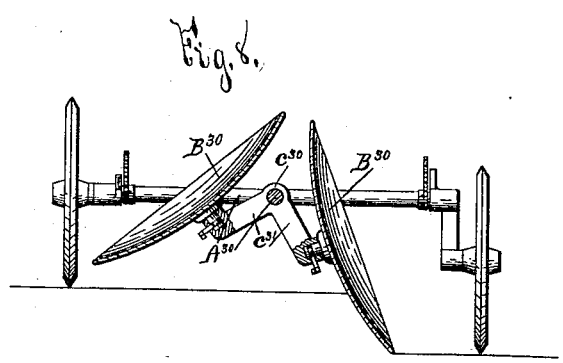

No. 816,518. PATENTED MAR. 27, 1906.
H. WIARD.
PLOW.
APPLICATION FILED SEPT. 7, 1899.
5 SHEETS—SHEET 4.
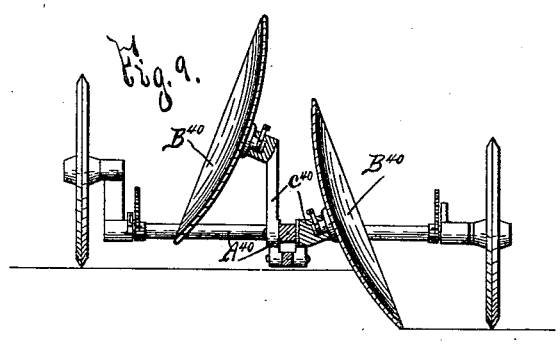
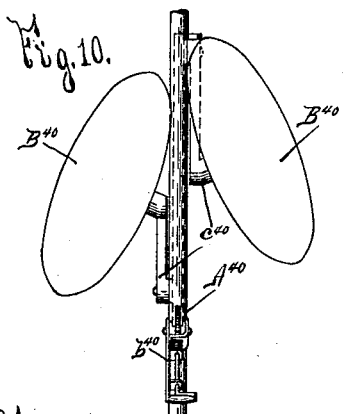
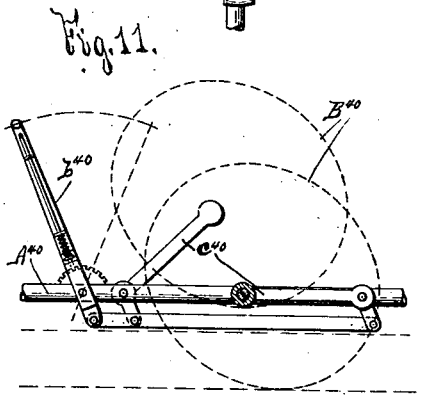
WITNESSES:
M. D. Lewis.
G. A. Cowles.
INVENTOR
Harry Wiard
BY
Hey & Parsons
ATTORNEYS.

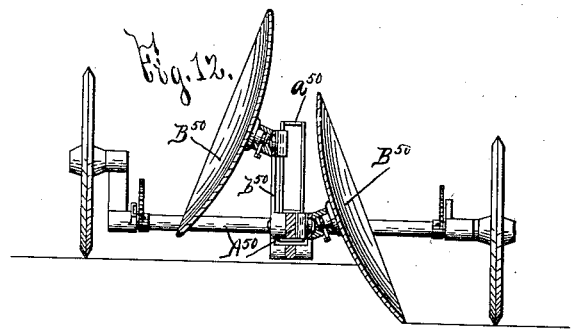
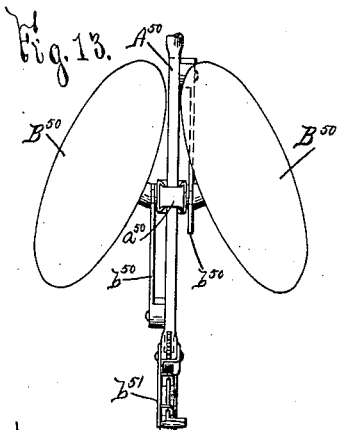
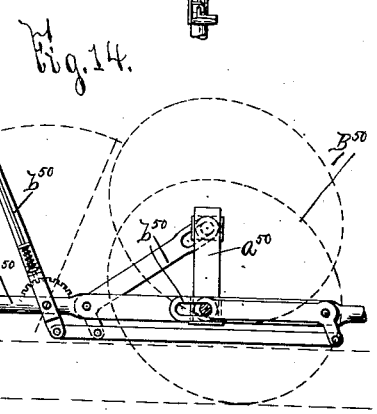

UNITED STATES PATENT OFFICE.

HARRY WIARD, OF SYRACUSE, NEW YORK.

PLOW.

No. 816,518.  Specification of Letters Patent.  Patented March 27, 1906.

Application filed September 7, 1899. Serial No. 729,716.

*To all whom it may concern:*

Be it known that I, HARRY WIARD, of Syracuse, in the county of Onondaga, in the State of New York, have invented certain new and useful Improvements in Plows, of which the following is a specification.

My invention relates to plows, and has for its object the production of a plow which is particularly simple in construction, easy of draft, and practical and effective in use; and to this end it consists in the combination, construction, and arrangement of the parts of a plow, as hereinafter fully described, and pointed out in the claims.

In describing this invention reference is had to the accompanying drawings, forming part of this specification, in which like letters indicate corresponding parts in all the views.

Figure 1 is a top plan view, partly broken away, of my plow. Fig. 2 is a vertical sectional view taken on line 2 2, Fig. 1, the supporting-wheels being shown by dotted lines. Figs. 3, 4, and 5 are vertical sectional views taken, respectively, on lines 3 3, 4 4, and 5 5, Fig. 1. Figs. 6, 7, 8, 9, and 12 are vertical sectional views, similar to Fig. 3, of modified constructions of my plow. Figs. 10 and 11 are respectively top plan view and side elevation of the rotary disks, the contiguous portion of the frame, and the supporting and reversing means for said disks seen in Fig. 9, the rotary disks being illustrated by dotted lines in Fig. 11. Figs. 13 and 14 are respectively top plan view and side elevation of the rotary disks, the contiguous portion of the frame, and the supporting and reversing means for said disks seen in Fig. 12, the rotary disks being shown by dotted lines in Fig. 14.

My plow preferably consists of a frame A, a reversible disk B, means for supporting and reversing said disk, arms C C, movable independently of each other in substantially vertical planes at opposite sides of the disk and in advance of the axis thereof and provided with supporting-wheels, means for actuating said arms, and a rear axle D, pivotally connected to the frame at the rear of the axis of the disk and having its extremities provided with supporting-wheels.

The frame A is of any desirable form, size, and construction and is here illustrated as consisting of a frame member $a$, arranged substantially horizontal and parallel with the line of the draft, and a second frame member $a'$, extending beyond opposite sides of the first frame member in advance of the axis of the disk B, said frame member $a'$ being rigid with the frame member $a$.

The disk B is of any suitable form, size, and construction and is reversible, so as to turn either right-hand or left-hand furrows, as may be desired. The means for supporting and reversing said disk preferably consists of a bearing $b$, an actuating member, here shown as a lever $b'$, and suitable connections between the bearing and actuating member. Said bearing is mounted on the frame member $a$, is rocked from right to left and vice versa on said frame member, and is provided with a forwardly-diverging arm $b^2$, in which the disk B is journaled. As the bearing $b$ is rocked from right to left or vice versa the disk B is rocked in a plane arranged at substantially right angles to the line of draft and is arranged in different positions on opposite sides of the frame member $a$ and the bearing $b$ in planes diverging from each other and the line of draft, so as to turn right-hand and left-hand furrows. The actuating member or lever $b'$ is of any desirable construction, is pivoted to the frame member $a$, and is held in its adjusted position by a dog movable on the lever and a suitable rack $b^3$, fixed to said frame member $a$. The connections between the bearing $b$ and the lever $b'$ are here illustrated as a bevel-gear $b^4$, fixed to the bearing $b$, a second bevel-gear $b^5$, journaled on the frame member $a$, and a link $b^6$, pivoted to the lever $b'$ and the gear $b^5$. As said lever $b'$ is moved backwardly and forwardly the bevel-gears $b^4$ $b^5$ and the link $b^6$ rock the disk B from right to left and vice versa.

The arms C C are pivoted at corresponding ends to the extremities of the frame member $a'$, are provided at their opposite ends with supporting-wheels $c$, and are movable independently of each other in substantially vertical planes. The means for actuating said arms usually consists of suitable levers $c'$, which are held in their adjusted position by dogs movable on said levers, and racks $c^2$, fixed to the extremities of the frame member $a'$. When the disk B is in position to turn a right-hand furrow, as illustrated in Fig. 1, the left-hand arm C is substantially vertical and the right-hand arm is substantially horizontal. Said arrangement of the arms C C facilitates the easy draft of the plow and affords ample clearage for the furrow turned by the disk B. It will be noted, however, that the arms C C are substantially reversed when the disk B is in position to turn a left-hand furrow.

The rear axle D is pivoted at its intermediate portion upon the rear end of the frame member $a$ at the rear of the axis of the disk B, and its opposite extremities move vertically as said axle rocks on its pivot and are provided with supporting-wheels $d$, which are free to assume the position indicated in Fig. 4, with one wheel riding in the furrow on the intermediate portion of the landside and the other upon the top surface of the ground to be plowed, and consequently when the disk is reversed the axle D rocks automatically upon its pivot and the wheel $d$, previously engaged with the surface of the soil, then rides in the furrow upon the intermediate portion of the landside. By supporting and arranging the rear axle D and the supporting-wheels $d$ as described the draft of the plow is comparatively light, the liability of lateral movement of its rear end is greatly prevented, and said rear end requires no adjustment or manipulation when the disk B is reversed.

In Fig. 6 I have shown a modified construction of my plow provided with a lengthwise frame member $a^{10}$, having a depressed portion $a^{11}$, upon which the bearing for a disk $B^{10}$ is journaled.

Additional modified constructions of my plow are illustrated in Figs. 7 and 8, which modifications are provided with bearings $c^{20}$ $c^{30}$, journaled on the frames $A^{20}$ $A^{30}$ and having diverging arms $c^{21}$ $c^{31}$ and opposite disks $B^{20}$ $B^{30}$ mounted on said arms, the arms $c^{21}$ being extended upwardly from the bearing $c^{20}$ and the arms $c^{31}$ being extended downwardly from the bearing $c^{30}$. In Figs. 9, 10, and 11 I have shown another modified construction of my plow provided with arms $c^{40}$, movable vertically in reverse directions and having corresponding ends supported by the frame $A^{40}$ and connected to an actuating-lever $b^{40}$, and disks $B^{40}$, journaled in the opposite ends of said arms.

Another modification of my plow is seen in Figs. 12, 13, and 14, this modification consisting of a frame $A^{50}$, provided with a substantially vertical guide $a^{50}$, disks $B^{50}$, movable lengthwise of said guide in reverse directions, and arms $b^{50}$, connected to said frame and to an actuating-lever $b^{51}$ and said disks $B^{50}$.

The construction and operation of my plow will now be readily understood upon reference to the foregoing description and the accompanying drawings, and it will be obvious to one skilled in the art that more or less change may be made in the component parts of said plow without departing from the spirit of my invention.

Having thus fully described my invention, what I claim as new, and desire to secure by Letters Patent, is—

1. A plow comprising a frame having a lengthwise member, a rotary disk, a support for the disk having a bearing journaled on said lengthwise frame member and movable from either side to the other of said member for reversing the disk, and means carried by said frame member for moving the disk from either side to the other of said member, substantially as and for the purpose specified.

2. A plow comprising a frame having a lengthwise member, a rotary disk, a support for the disk having a bearing journaled on said lengthwise frame member and movable from either side to the other of said member for reversing the disk, an axle pivoted to the frame member at the rear of the disk and extended laterally on opposite sides of said member, furrow-wheels mounted on the axle on opposite sides of the frame member, and means carried by the frame member for moving the disk from either side to the other of said member, substantially as and for the purpose described.

3. A plow comprising a frame having a lengthwise member, a rotary disk, a support for the disk having a bearing journaled on said lengthwise frame member and movable from either side to the other of said member for reversing the disk, and means for moving the disk from either side to the other of the frame member, said means comprising a lever pivoted to the frame member and movable forwardly and rearwardly on its pivot, and power-transmitting means between the lever and the bearing for the disk, substantially as and for the purpose set forth.

4. A plow comprising a frame having a lengthwise member, and a member extending crosswise of the first-mentioned member and rigid therewith, arms pivoted on the ends of the crosswise member, supporting-wheels journaled on said arms, means for raising and lowering said arms independently of each other, a rotary disk supported by the lengthwise member at the rear of the crosswise member, and movable from either side to the other of said lengthwise member for reversing the disk, furrow-wheels supported by the lengthwise frame member at the rear of the disk and on opposite sides of the lengthwise frame member, said furrow-wheels being free to move vertically, and means for moving the disk from either side to the other of the lengthwise frame member, substantially as and for the purpose specified.

5. A plow comprising a frame, a rotary disk supported by the frame and movable on a substantially horizontal axis substantially parallel to the line of draft for reversing the disk from right to left and vice versa, an axle pivoted to the frame at the rear of the axis of the disk, and wheels mounted on the extremities of the axle, one of the wheels having its tread movable in the furrow when the disk is in an operative position and the other wheel having its tread movable in the furrow when the disk is in its reversed operative position, substantially as and for the purpose described.

6. A plow comprising a frame, a rotary disk supported by the frame and movable on a substantially horizontal axis substantially parallel to the line of draft for reversing the disk from right to left and vice versa, an axle having its intermediate part pivoted to the frame at the rear of the axis of the disk and free to move on its pivot, and wheels mounted on the extremities of the axle, one of the wheels having its tread movable in the furrow when the disk is in an operative position and the other wheel having its tread movable in the furrow when the disk is in its reversed operative position, substantially as and for the purpose specified.

In testimony whereof I have hereunto signed my name, in the presence of two attesting witnesses, at Syracuse, in the county Onondaga, in the State of New York, this 31st day of August, 1899.

HARRY WIARD.

Witnesses:
 ARTHUR E. PARSONS,
 K. H. THEOBALD.